US006956672B1

(12) United States Patent
Huang et al.

(10) Patent No.: US 6,956,672 B1
(45) Date of Patent: Oct. 18, 2005

(54) METHOD FOR MIXING INKS FOR HIGH FIDELITY COLOR PRINTING

(75) Inventors: Xuan-Chao Huang, Lexington, KY (US); Brant Dennis Nystrom, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 896 days.

(21) Appl. No.: 09/826,670

(22) Filed: Apr. 5, 2001

(51) Int. Cl.$^7$ ............................. G06K 15/00; H04N 1/46
(52) U.S. Cl. ........................ 358/1.9; 358/2.1; 358/504; 358/529
(58) Field of Search .................... 358/1.9, 2.1, 3.27, 358/1.16, 504, 518, 522, 524, 530, 515, 520, 358/529; 382/162, 167

(56) References Cited

U.S. PATENT DOCUMENTS

| | | | |
|---|---|---|---|
| 4,428,694 A | 1/1984 | Ragen | |
| 4,459,675 A | 7/1984 | Bateson et al. | |
| 4,669,900 A | 6/1987 | Miyake et al. | |
| 4,804,281 A | 2/1989 | Yamakawa et al. | |
| 4,897,589 A | 1/1990 | Fujiwara et al. | |
| 4,965,881 A | 10/1990 | Dilley | |
| 4,987,526 A | 1/1991 | Slocum et al. | |
| 5,007,751 A | 4/1991 | Yamakawa | |
| 5,069,556 A | 12/1991 | Sasaki et al. | |
| 5,073,909 A | 12/1991 | Kotzin et al. | |
| 5,111,286 A * | 5/1992 | MacDonald et al. | 358/500 |
| 5,299,291 A | 3/1994 | Ruetz | |
| 5,333,243 A | 7/1994 | Best et al. | |
| 5,383,143 A | 1/1995 | Crouch et al. | |
| 5,689,349 A * | 11/1997 | Plettinck et al. | 358/500 |
| 5,699,491 A | 12/1997 | Barzel | |
| 5,729,664 A | 3/1998 | Ishikawa | |
| 5,734,800 A | 3/1998 | Herbert et al. | |
| 5,809,213 A | 9/1998 | Bhattacharjya | |
| 5,915,075 A | 6/1999 | Kadowaki | |
| 5,923,824 A | 7/1999 | Yokomizo | |
| 5,933,578 A | 8/1999 | Van de Capelle et al. | |
| 5,949,967 A | 9/1999 | Spaulding et al. | |
| 5,982,924 A | 11/1999 | Power et al. | |
| 5,982,990 A | 11/1999 | Gondek | |
| 5,982,992 A | 11/1999 | Waldron | |
| 5,987,168 A | 11/1999 | Decker et al. | |
| 5,991,511 A | 11/1999 | Granger | |
| 5,995,716 A | 11/1999 | Harrington et al. | |
| 6,008,907 A | 12/1999 | Vigneau et al. | |
| 6,021,255 A | 2/2000 | Hayashi et al. | |
| 6,038,374 A | 3/2000 | Jacob et al. | |
| 6,057,931 A | 5/2000 | McConnell et al. | |
| 6,061,144 A | 5/2000 | Mamizuka | |
| 6,061,501 A | 5/2000 | Decker et al. | |
| 6,064,493 A | 5/2000 | Neff | |
| 6,072,901 A | 6/2000 | Balonon-Rosen et al. | |
| 6,075,927 A | 6/2000 | Sakai et al. | |

(Continued)

Primary Examiner—Jerome Grant, II
(74) Attorney, Agent, or Firm—Stoll, Keenon & Park, LLP (57) ABSTRACT

A computerized method for mixing inks to facilitate high fidelity color reproduction for printing includes the steps of using a theoretical printer model to establish relationship between the colorant space and the color space using the small number of measurements; building a simplified colorant space wherein each color in the color space corresponds to only one colorant point; sampling the color space for accurate calibration; performing interpolation and correction for any non-calibrated points based on the theoretical and experimental results; and building a color reproduction table that accepts image data as input and output colorant combinations for use by the printer to achieve high fidelity color printing.

36 Claims, 5 Drawing Sheets

U.S. PATENT DOCUMENTS 6,084,689 A    7/2000  Mo
6,483,606 B1 * 11/2002 Klassen et al. .............. 358/1.9
6,724,507 B1 * 4/2004  Ikegami et al. ............. 358/518
2002/0105659 A1 * 8/2002 Rozzi ........................ 358/1.9

* cited by examiner

METHOD FOR MIXING INKS FOR HIGH FIDELITY COLOR PRINTING

BACKGROUND OF THE INVENTION

The present invention relates broadly to ink-based, computer controlled printers and, more particularly, to a method to mix more than four inks for high fidelity color reproduction in color printing.

Traditionally, within the printing industry, three or four inks have been used in various printers. A three-ink printer uses cyan, magenta and yellow inks (CMY). A four-ink printer adds black ink to the basic CMY system to achieve deeper shadow tones. Black is designated "K" and therefore the CMY system becomes a CMYK system with the addition of black ink. Such three and four ink printers produce red (or orange), green, or blue color by overprinting two of the color inks on top of one another. The gamut of overprinting colors available to a given printer is restricted by the properties of the color inks and does not meet the demand of very high quality printing. Recently, printing systems with additional ink such as red (or orange), green, and blue or any combination thereof have been developed for high fidelity (hi-fi) color printing. These inks, such as CMYKOG or CMYKRGB are often referred to as hi-fi color inks and the printing system that utilizes such inks is known as a hi-fi or high fidelity printer.

High fidelity color printing can be difficult. For example, one of the difficulties involves generating a colorant combination for a given color since there are many colorant combinations that can produce the same color. One attempt to address this problem involved dividing the inks into three-ink subgroups, e.g., CMY, RMY, CGY and others. Another attempt to address this problem involved partitioning the inks into four-ink subgroups, e.g., GYRK, YRMK, RMBK, MBCK, BCGK, CGYK for a CMYKRGB seven-ink hi-fi printer. A third approach has been to divide the inks into three-ink subgroups if there is no yellow ink in the subgroup and otherwise into four-ink subgroups. All of the approaches first calibrated each subgroup individually and then they search a colorant combination for a given color among the subgroups.

Problems still remain with these approaches. First, it is difficult to determine one colorant combination for a given color since the color gamuts of the subgroups overlap one another. Many unnecessary measurements could be done in calibrating the individual groups. For example, if there were four different colorant combinations from the subgroups that could produce the same color, then it would have been possible to do one measurement near the color. Nevertheless, the prior approaches required four measurements. Calibration in such approaches is difficult. In one approach, 625 patches were measured for each of the six, four-ink subgroups. This provided a total of 3,750 patches for a seven-ink hi-fi printer with only five color points covering the entire range of each ink. If selecting nine patches for each of the six, four-ink subgroups, a total of 49,366 calibrating patches is the result. The number of patches available makes this approach unrealistic. Additionally, abrupt ink changes may occur in a gradually changed image by these approaches due to the fact that one color could be reproduced by one, two, or three-overprinting on top of each other. For example, selecting green ink may reproduce a green color and selecting cyan and yellow inks may reproduce a lighter green color. The abrupt ink change for a smooth image may produce unpleasant patterns on some substrates.

SUMMARY OF THE INVENTION

It is accordingly an object of the present invention to provide a new method for mixing inks for high fidelity color printing that addresses the above discussed problems.

It is another object of the present invention to provide a method for mixing that provides a one-to-one relationship between a colorant space and a color space, thereby enhancing the ability of the printer to produce correct colorant combinations.

It is another object of the present invention to provide such a method wherein no abrupt ink changes will occur for a smooth image.

It is another object of the present invention to provide such a method that can be applied to any number of inks used.

To those ends, the present invention provides a computerized method for mixing inks to facilitate high fidelity color reproduction for printing, with the method including the steps of computing a first color space using a forward printer model and a first colorant space, with the first color space having no black ink values from the first colorant space, thereby establishing a relationship between the first color space and the first colorant space. Additionally, the method includes the steps of computing a second colorant space using the forward printer model wherein each point in the second colorant space has one corresponding point in the first color space and computing a second color space using the forward printer model and CMYK ink values. Next a third color space is computed by comparing the second color space to the first color space to determine which color points in the first color space require black ink. The method next includes the step of computing a third colorant space using the printer model and the third color space, wherein each point in the third colorant space has a corresponding point in the third color space. Next, the method includes the steps of computing a fourth color space by calibrating and correcting the third color space; linking the fourth color space with the third colorant space using the forward printer model, wherein each point in the fourth color space has a corresponding point in the third color space; and forming a color reproduction table using the fourth color space and the third colorant space. The color reproduction table is for receiving a data input and providing a colorant output for use in mixing inks for high fidelity printing.

It is preferred that the method for mixing inks includes within the step of computing a first color space, the step of using a Neugebauer printer model to calculate CIELAB color values to form the first color space, with a CIELAB color value being calculated for each colorant point in the first colorant space based on at least one predetermined measurement. It is further preferred that the method for mixing inks includes the steps of calculating CIELAB color values includes sampling each ink at seventeen substantially evenly spaced points over the range from 0–100% ink.

Preferably, the method for mixing inks includes within the step of computing a second colorant space, the step of removing redundant colorant points including certain multiple colorant points to which a single color point corresponds, the removal step including defining a removal grade for each colorant point linked with a common color point and retaining the colorant points with the smallest removal grade for each color point in the first color space, with the second colorant space resulting from the removal of the redundant colorant points.

It is further preferred that the method for mixing inks includes within the step of computing a second color space, the steps of preparing a mixed CMYK colorant space and inputting every point in the mixed CMYK colorant space into the model to compute the second color space.

The method for mixing inks further preferably includes within the step of computing a third color space, the steps of comparing the first color space to the second color space to determine the black ink values necessary for addition to the first color space to form the third color space.

Preferably, the method for mixing inks includes within the step of computing a third colorant space, the step of correlating points in the third color space with points in the second colorant space using the printer model to form the third colorant space.

It is preferred that the method for mixing inks includes within the step of computing a fourth color space, the step of sampling the third color space for calibration, and comparing an actual color value from the third color space with a theoretical color value from the model.

Preferably, the method for mixing inks includes within the step of computing a fourth color space, the step of correcting color point values found to be out of tolerance to form a fourth color space having calibrated and corrected values from the third color space.

It is preferred that the method for mixing inks includes within the step of linking the fourth color space, the step of correlating the fourth color space point values with the third colorant space values.

Preferably, the method for mixing inks includes within the step of forming a color reproduction table, the step of inverting the relationship between the third colorant space and the fourth color space to instill the ability to receive as input a given color value and to emit as output a corresponding colorant value. It is further preferred that the method for mixing inks includes within the step of forming a color reproduction table, the step of computing a colorant value for each color value to form the color reproduction table includes using a tetrahedral linear interpolation.

The present invention is also directed to a computer program product for controlling a printer to achieve high fidelity color printing. To that and other ends, a printer driver computer software product embodied in a computer readable medium for controlling ink mixing to facilitate high fidelity color reproduction for printing includes a color reproduction table that accepts image data as input and emits colorant combinations for use by the printer to mix inks to achieve high fidelity color printing. The color reproduction table is formed by first computing a first color space using a forward printer model and a first colorant space, with the first color space having no black ink values from the first colorant space, thereby establishing a relationship between the first color space and the first colorant space.

The method then continues with the steps of computing a second colorant space using the forward printer model wherein each point in the second colorant space has one corresponding point in the first color space; computing a second color space using the forward printer model and CMYK ink values; and computing a third color space by comparing the second color space to the first color space to determine which color points in the first color space require black ink. A third colorant space is then computed using the printer model and the third color space, wherein each point in the third colorant space has a corresponding point in the third color space. Next, the method continues with the steps of computing a fourth color space by calibrating and correcting the third color space; linking the fourth color space with the third colorant space using the forward printer model, wherein each point in the fourth color space has a corresponding point in the third color space; and forming the color reproduction table using the fourth color space and the third colorant space, for providing a colorant output responsive to a data input for use in mixing inks for high fidelity printing.

Preferably, the step of computing a first color space includes using a Neugebauer printer model to calculate CIELAB color values to form the first color space, with a CIELAB color value being calculated for each colorant point in the first colorant space based on at least one predetermined measurement. Further, the steps of calculating CIELAB color values includes sampling each ink at seventeen evenly spaced points over the range from 0–100% ink.

It is preferred that the step of computing a second colorant space includes the step of removing redundant colorant points including certain multiple color points to which a single point in the first color space corresponds. The removal step includes defining a removal grade for each colorant point linked with the same color point and retaining the colorant points with the smallest removal grade for each color point in the first color space, with the second colorant space resulting from the removal of the redundant colorant points.

It is further preferred that the step of computing a second color space includes the steps of preparing a mixed CMYK colorant space and inputting every point in the mixed CMYK colorant space into the model to compute the second color space.

Preferentially, the step of computing a third color space includes the steps of comparing the first color space to the second color space to determine the black ink values necessary for addition to the first color space to form the third color space.

Preferably, the step of computing a third colorant space includes using the printer model to correlate points in the third color space with points in the second colorant space to form the third colorant space.

It is preferred that the step of computing a fourth color space includes the step of sampling the third color space for calibration, and comparing an actual color value from the third color space with a theoretical color value from the printer model.

It is further preferred that the step of computing a fourth color space includes the step of correcting color point values found to be out of tolerance to form a fourth color space having calibrated and corrected values from the third color space.

Preferably, the step of linking the fourth color space includes correlating the fourth color space point values with the third colorant space values.

It is preferred that the step of forming a color reproduction table includes the step of inverting the relationship between the third colorant space and the fourth color space to instill the ability to receive as input a given color value and to emit as output a corresponding colorant value. Further, the step of forming a color reproduction table includes the step of computing a colorant value for each color value to form the color reproduction table includes using a tetrahedral linear interpolation.

The present invention also resides in the form of an improvement in an ink-based printer. Therefore, in an apparatus for printing on a print medium, the improvement comprises a preprogrammed control arrangement for controlling ink mixing to facilitate high fidelity color reproduction for printing.

The control arrangement includes an arrangement for computing a first color space using a forward printer model and a first colorant space, with the first color space having no black ink values from the first colorant space, thereby establishing a relationship between the first color space and the first colorant space. An arrangement for computing a second colorant space using the forward printer model wherein each point in the second colorant space has one corresponding point in the first color space is also included. Further included is an arrangement for computing a second color space using the forward printer model and CMYK ink values. Also, an arrangement is included for computing a third color space by comparing the second color space to the first color space to determine which color points in the first color space require black ink. Further, an arrangement is provided for computing a third colorant space using the printer model and the third color space, wherein each point in the third colorant space has a corresponding point in the third color space. The present invention also includes an arrangement for computing a fourth color space by calibrating and correcting the third color space. An arrangement is provided for linking the fourth color space with the third colorant space using the forward printer model, wherein each point in the fourth color space has a corresponding point in the third color space. Finally, an arrangement is included for forming a color reproduction table using the fourth color space and the third colorant space, for providing a colorant output responsive to a data input for use in mixing inks for high fidelity printing.

Preferably, the step of computing a first color space includes using a Neugebauer printer model to calculate CIELAB color values to form the first color space, with a CIELAB color value being calculated for each colorant point in the first colorant space based on at least one predetermined measurement.

It is preferred that the step of calculating CIELAB color values includes sampling each ink at seventeen substantially evenly spaced points over the range from 0–100% ink. Further, and preferentially, the step of computing a second colorant space includes the step of removing redundant colorant points including certain multiple colorant points to which a single color point corresponds, the removal step including defining a removal grade for each colorant point linked with a common color point and retaining the colorant points with the smallest removal grade for each color point in the first color space, with the second colorant space resulting from the removal of the redundant colorant points.

It is further preferred that the step of computing a second color space includes the steps of preparing a mixed CMYK colorant space and inputting every point in the mixed CMYK colorant space into the model to compute the second color space.

Preferably the step of computing a third color space includes the steps of comparing the first color space to the second color space to determine the black ink values necessary for addition to the first color space to form the third color space. Further, and preferably, the step of computing a third colorant space includes the step of correlating points in the third color space with points in the second colorant space using the printer model to form the third colorant space.

It is preferred that the step of computing a fourth color space includes the step of sampling the third color space for calibration, and comparing an actual color value from the third color space with a theoretical color value from the model. Preferably the step of computing a fourth color space includes the step of correcting color point values found to be out of tolerance to form a fourth color space having calibrated and corrected values from the third color space.

It is further preferred that the step of linking the fourth color space includes correlating the fourth color space point values with the third colorant space values. Preferably, the step of forming a color reproduction table includes the step of inverting the relationship between the third colorant space and the fourth color space to instill the ability to receive as input a given color value and to emit as output a corresponding colorant value.

It is preferred that the step of forming a color reproduction table includes the step of computing a colorant value for each color value to form the color reproduction table includes using a tetrahedral linear interpolation.

By the above, the present invention provides a method, a computer software product and an improved printer that utilizes certain color transformations and measurements to enhance the ability of an ink-based printer to perform high fidelity color printing.

DESCRIPTION OF THE PREFERRED EMBODIMENT

It should be noted at the outset that the present invention involves a computerized process and it is within the skill of those in the art to generate the computer code necessary to carry out the method steps, explained in greater detail below. The result of the method is a color reproduction table that can become part of a printer driver embodied on a computer-readable disk, or it may be programmed into the printer hardware. Whatever the manifestation of the invention, those skilled in the computer-controlled printer art will be able to incorporate the present method into a format for commercial use without undue experimentation.

Figure 1:
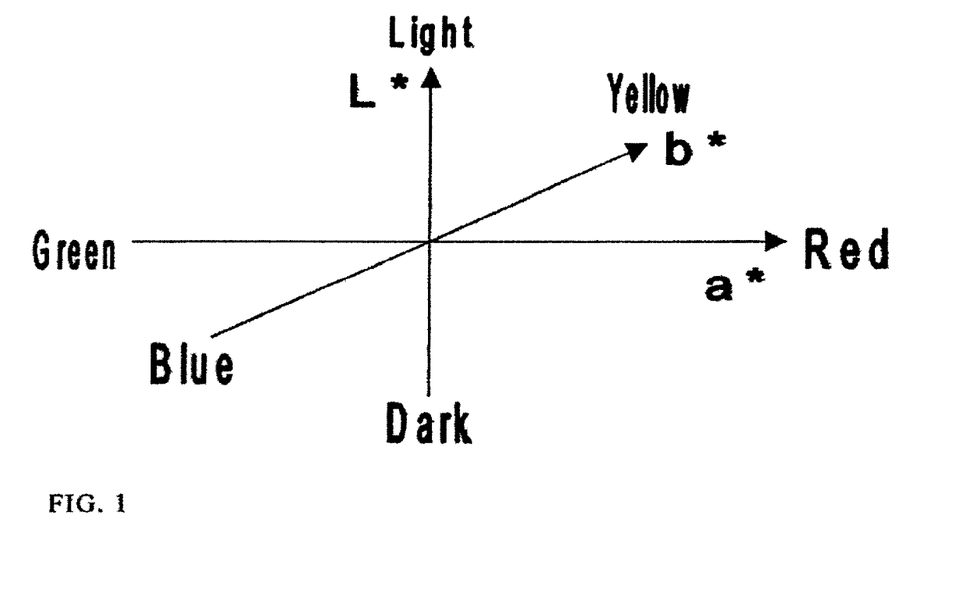
FIG. 1 is a diagrammatic view of a Cartesian Coordinate System representing a CIELAB color space.

According to the present invention, a forward printer model is used to transform a colorant space to a CIELAB color space. The colorant space refers to a Cartesian Coordinate System wherein coordinates represent the amount of ink used to produce a color. For N-ink printing, the colorant space is N-dimensional. There will be N coordinates for any particular colorant point Q. Similarly, the CIELAB color space may be defined on a Cartesian Coordinate System. The CIELAB color space is used for the specification of color differences and consists of three variables, $L^*$, $a^*$ and $b^*$ forming the three-dimensional color space, as seen in FIG. 1. The $L^*$ axis coordinates to perceived lightness ranging from 0.0 for black to 100.0 for a diffuse white. The $a^*$ and $b^*$ dimensions correlate approximately with red-green and yellow-blue chroma perceptions. They are capable of both negative and positive values and the maximum values are limited by the physical properties of the material. The color difference between two color points, e.g.

$L^*_1$, $a^*_1$, $b^*_1$ and $L^*_2$, $a^*_2$, $b^*_2$ is defined by the distance between two points and is computed by:

$$\Delta E^*_{ab}=[(L^*_2-L^*_1)^2+(a^*_2-a^*_1)+(b^*_2-b^*_1)]$$

Figure 2:
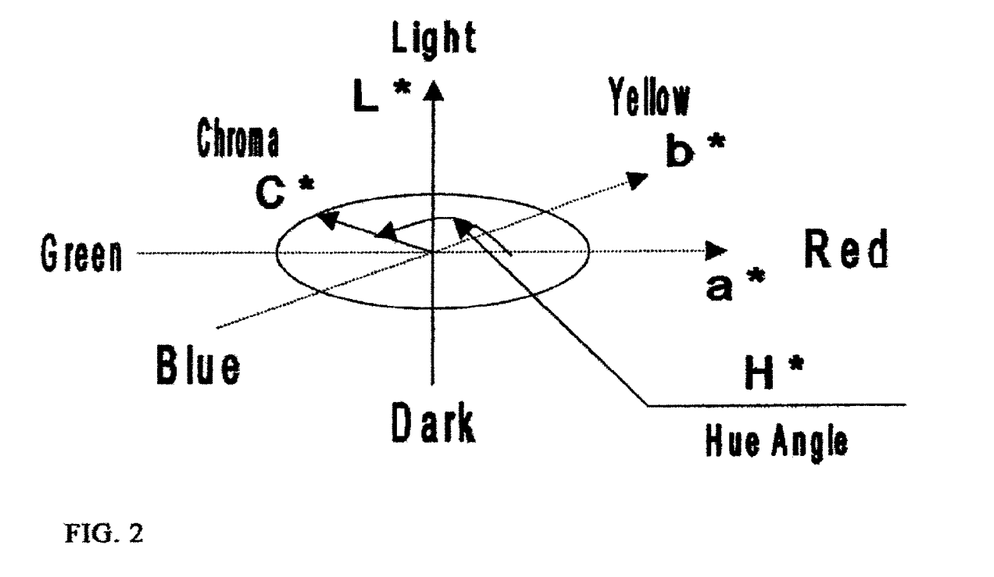
FIG. 2 is a diagrammatic view of a Cylindrical Coordinate System representing a CIELAB color space.

The CIELAB color space can also be represented by cylindrical coordinates as shown in FIG. 2. The Cylindrical coordinate system provides predictors of lightness, L*, chroma, C* and hue, h*. The chroma coordinates the colorfulness of an area and the hue correlates the types of colors such as red, green, blue, yellow and other colors. The relationships among a*, b*, C* and h* is given by the following:

$$C^*=[a^{*2}+b^{*2}]^{1/2}$$

$$h^*=\tan^{-1}(b^*/a^*)$$

$$a^*=C^* \cos(h^*)$$

$$b^*=C^* \sin(h^*)$$

The present invention employs a Neugebauer forward printer model. The Neugebauer model is essentially an additive color model and under the additive color theory the reflectance of a print is the sum of the reflectance of each combination of ink, weighting each by the relative proportion of the paper that it occupies. Each ink combination, therefore, is a primary under the additive model and such combinations are referred to as Neugebauer primaries.

The Neugebauer model may be expressed symbolically as:

$$R=a_p R_p+a_c R_c+a_n R_n+a_y R_y+a_r R_r+a_g R_g+a_b+a_b R_b+a_3 R_3$$

Where R is the reflectance of the multi-colored tint each $R_i$ is the reflectance of the corresponding primary and each $a_i$ are the relative areas of the paper covered by the indicated primary. The subscripts $p, c, n, y, r, g, b$ and $3$ denote the primary under consideration, namely, paper, cyan, magenta, yellow, red, green, blue and 3-color overprint, respectively. Neugebauer used a model by Demichel for the relative area of each primary. The relative areas relate to the half tone by areas on paper of the cyan, magenta and yellow halftone dots.

According to the present invention, and as will be explained in greater detail hereinafter, the forward printer model is used to transform the colorant space to the CIELAB color space. Next, redundant colorant points that are associated with the same CIELAB color point are removed resulting in a simplified colorant space, also referred to as the second colorant space, that has a one-to-one relationship with the CIELAB color space. Calibration points are then sampled from the first CIELAB color space. Each colorant point corresponding to each selected color point is used to print out a patch for actual color measurement. Errors between theoretical and experimental color values for the calibration points are then interpolated to the non-calibrated neighboring theoretical color points, thereby giving a corrected CIELAB color space, which contains either calibrated or corrected values. Each value corresponds to a colorant point in the simplified colorant space.

It should be noted that the term "values" and "points" are used somewhat interchangeably in the present text. The term "point" refers to a point in the color or colorant space while the term "value" refers to the amount of ink or color of any given colorant point or color point. A color point or colorant point is defined by its values. For an N-ink colorant space, the colorant point will have N discrete values that will uniquely locate the colorant point in the colorant space. A similar statement may be made for the color space.

Finally, a color reproduction table is created for high fidelity color printing using the simplified colorant space and the corrected CIELAB color space.

It should be noted that four CIELAB color spaces are computed when practicing the method of the present invention. These include the first color space, or color space I. The first color space has no link to the black ink. When computing the first color space, black ink is set to zero for each colorant point. This is used for constructing the simplified colorant space, also known as the first colorant space.

The second color space, or color space II is linked to CMYK inks only. When computing color space II, all other inks are set to zero for each colorant point. This is used for determining which color points in color space I should be induced black ink and how much black ink should be used for each of the color points.

The third color space, or color space III is linked to an updated simplified colorant space, referred to as the second colorant space that includes black ink.

Finally, color space IV, referred to as the fourth color space, is the last color space, which contains calibrated and corrected color points. These color points are linked to the updated simplified colorant space, including black ink. This forms the third colorant space. The third colorant space and the fourth color space are used to generate the color reproduction table.

Figure 3:
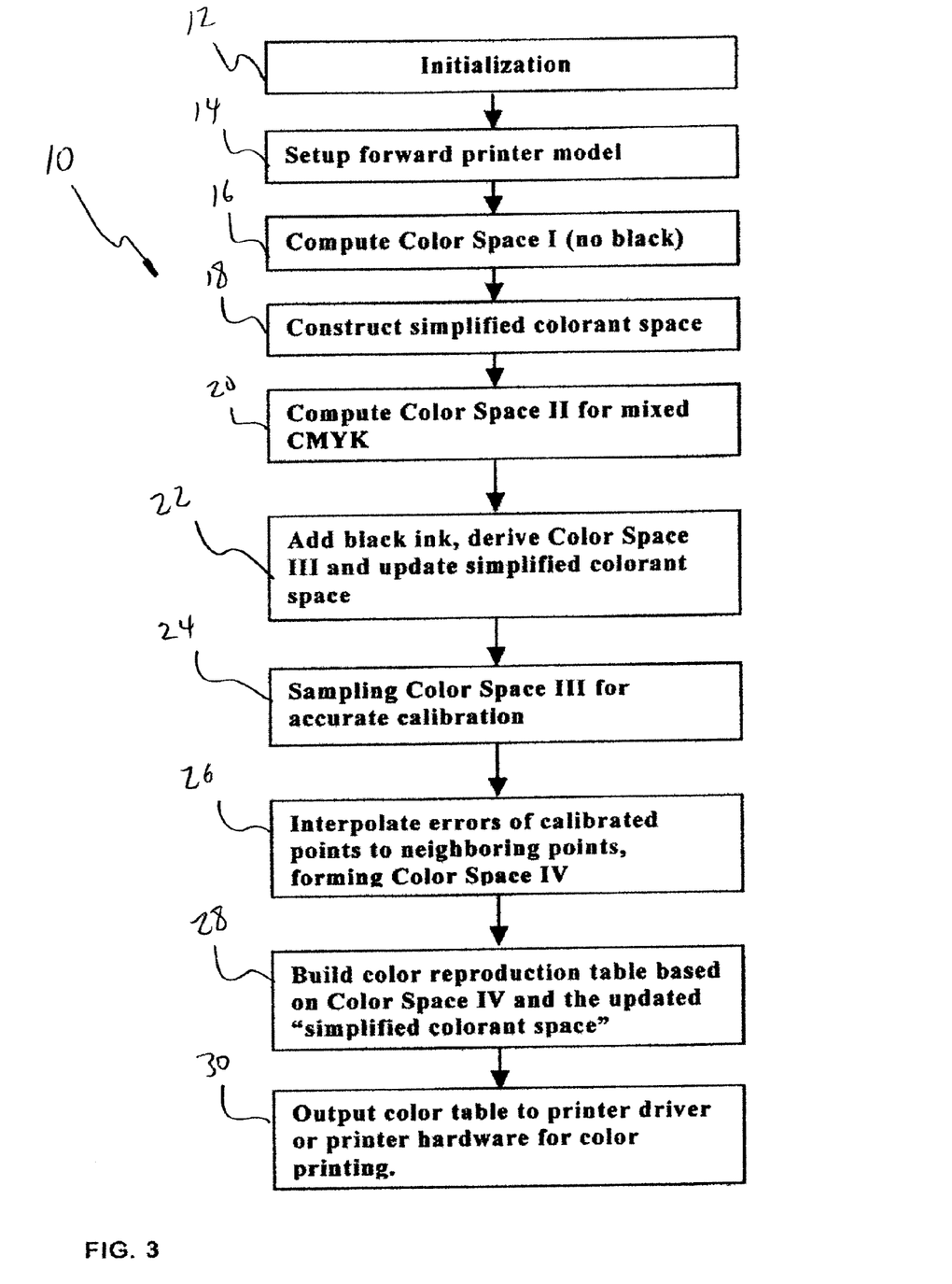
FIG. 3 is a flow chart representing the basic method steps of the present invention.

A flow chart of the present method is illustrated generally at 10 in FIG. 3, and with reference thereto, the system is initialized at 12, and a modified Neugebauer forward printer model is setup at 14 and is used to transform the initial colorant space to a tristimulus space and further to the CIELAB color space. By using this model, the first color space is formed, as illustrated at 16 and having a CIELAB color value for each colorant point based on some measurements.

These measurements include a measurement of the area coverage of inks wherein each ink is sampled of seventeen evenly spaced points over the range from 0% to 100% ink for CMYKOG 6-inks, a total of 102 patches are prepared for measuring the tristimulas values with a spectrophotometer. Next, the Neugebauer primary colors are measured. Each Neugebauer primary color is one of all combinations of all inks with each having two levels, namely, 0% and 100% ink. A total of 64 Neugebauer primary color patches need to be measured for six inks.

One prior way to compute the color space is to input all colorant points to the model. This is far too time consuming for high fidelity color space where there are more than four inks. To speed up the computation while keeping the interpolation errors of the subsequent processes within a predetermined tolerance, seventeen substantially evenly spaced points are selected over the range of each ink and all the combinations are input to the model. Each computed color has a link to the inputted colorant point.

In a high fidelity colorant space, different colorant points may produce the same color. Therefore, one color point in the first color space may link to several colorant points. For the unique solution in finding a colorant point for a given color, unused colorant points must be removed. Removal of these unused colorant points results in the simplified colorant space or the second colorant space, as illustrated at 18.

Figure 4:
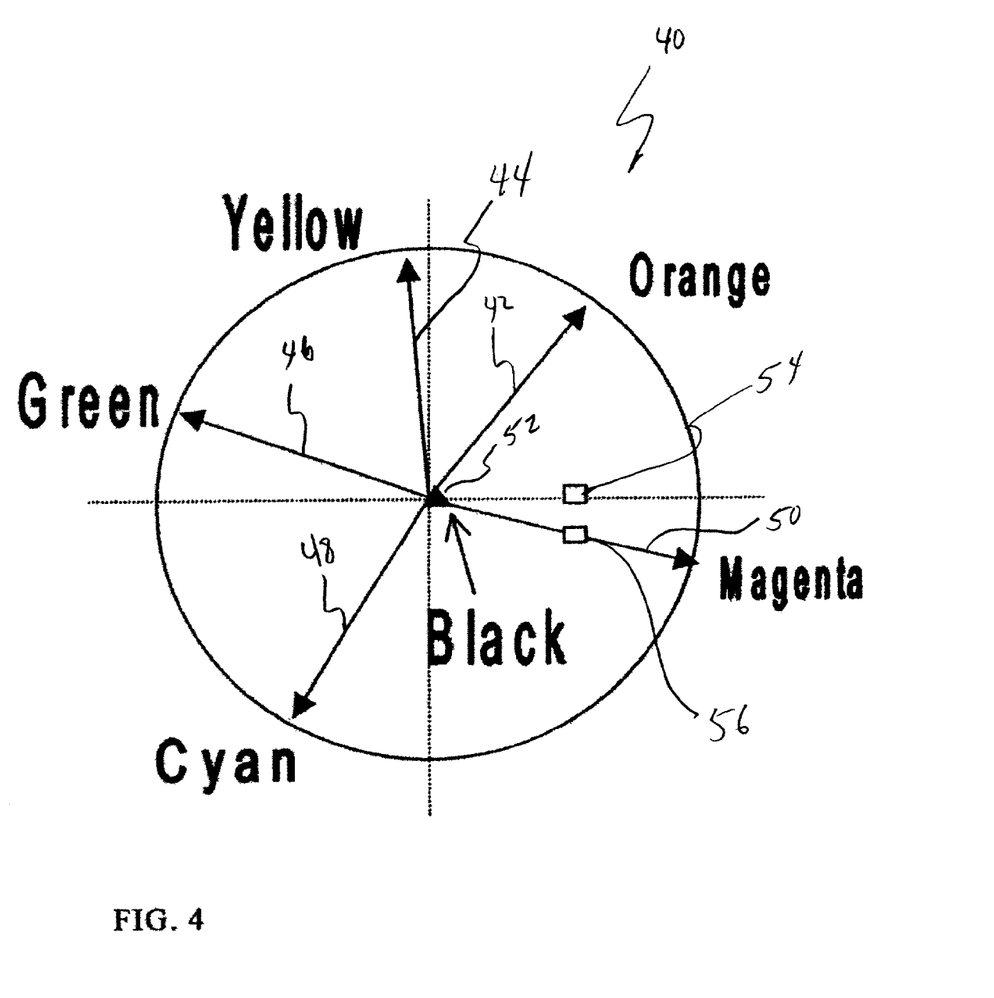
FIG. 4 is a diagrammatic view of the primary hues of CMYKOG 6-inks.

First, a primary hue determination is made. The hue angle of each ink is calculated with the printer model by inputting a non-zero digital count for that ink and zeros for all other inks. Sixteen hue angles are computed with 16 non-zero digital counts evenly spaced over the range of each ink. The average value of the 16 angles is defined as the primary hue of the ink. FIG. 4 illustrates the primary hues for CMYKOG 6-inks. In FIG. 4, cyan is illustrated at 48, magenta is illustrated at 50, yellow is illustrated at 44, black is illustrated at 52, orange is illustrated at 42 and green is illustrated at 46.

Next, a removal index is computed. In order to calculate a removal index for a colorant point, certain calculations must be made. For example, for a color point linked with several colorant points the following is computed for each colorant point $Q=[q_0, q_1 \ldots, q_{n-1}]$:

First determine the number of inks ($F_n$) which is the number of non-zero colorants in a colorant point:

$$F_n = \sum_{j=0}^{N-1} \eta_j \quad \eta_j = 1 \text{ if } q_j > 0, \text{ otherwise } \eta_j = 0$$

Second, the ink amount (Fa) is computed as the sum of the colorants in a colorant point:

$$F_a = \sum_{j=0}^{N-1} q_j$$

All color points at the primary hue of each ink are first addressed. The colorant removal indices associated with these points are computed based on only the number of inks and ink amount. For all other color points other factors shown below are also computed.

The ink change ($F_c$) includes the sum of changes of each colorant in a colorant point. This change is calculated by subtracting the colorant with the colorant linked to the newest color point which should be linked with only one colorant point by the time this calculation occurs because it was assessed initially. The nearest color point should be at the primary hue of the nearest ink. With continued reference to FIG. 4, the color point illustrated at 54 is under consideration its nearest ink is magenta. At the primary hue of magenta the color point illustrated at 56 is the nearest color point of color point 54. If the colorant point linked with the color point 56 is denoted by: $Q_A = \{q_{A0}, q_{A1} \ldots q_{AN-1}\}$ then the computation is shown as follows:

$$F_c = \sum_{j=0}^{N-1} |q_j - q_{Aj}|$$

A hue change ($f_h$) is calculated as the sum of differences between the primary hue of each colorant in a colorant point and the primary hue of the nearest ink, for example magenta in the above example. This is given by the equation:

$$F_h = \sum_{j=0}^{N-1} |h_j - h_{Aj}|$$

Where $h_j$ is the primary hue angle of colorant $q_j$ and $h_{aj}$ is the primary hue angle of the nearest ink.

For a given reproduced color, the goal is to use a fewer number of inks, a less amount of inks, have less ink change for a given color difference to maximize the color-to-ink contrast, and use less-changed properties of inks for reduced hue change. Therefore, the greater the above computed values, the higher chance the colorant point or color combinations should be removed. The above values are referred to as removal factors. For the same type of removal factor, there will be M values for M colorant points that produce the same color. It is given a removal grade according to the increasing order of the removal factor values.

The weighted sum of the removal grades for each colorant point is defined as the removal index, D, as shown below:

$$D = w_n G_n + w_a G_a + w_c G_c + w_h G_h$$

Where w is the weight factor.

For M colorant points linked with the same color, there will be M removal grades. The colorant point with the smallest removal index will be maintained in the colorant space and all other colorant points will be removed. From this process, the simplified colorant space, or the second colorant space is derived which will have a one-to-one relationship with the first color space.

After the second color space is computed, the third color space can be derived by adding black ink, as illustrated in FIG. 3 at 22. The technique described below will allow using black ink mixing techniques available in CMYK printing. First, all links are set to zero except CMYK and the black ink mixing technique available in CMYK printing is used to mix every qualified point of the CMY colorant space and to the CMYK colorant space.

Every point in the mixed CMY colorant space is input to the model to compute color space II. The amount of black ink required for each color point in color space I is determined by comparing color space I to color space II. If the color space II has some portion, for example, the darkest portion, outside the first color space, then the portion will be added to the first color space together with the links of the CMYK colorants. After adding the black ink to a color point in the first color space the original color is maintained by reducing the originally linked non-zero colorants. This is done using the printer model through iterated computations. This process will produce the third color space in which every color point has a link with the updated simplified colorant space including black ink, which is identified as the third colorant space.

The third colorant space should then be calibrated and to that end, the color space needs to be sampled for accurate calibration, as illustrated at 24. In the calibration, $N_1$ points are sampled along the L* axis, $N_h$ points around the hue, and $N_c$ points along the chroma direction are sampled. Since there are $N_h$ points overlapped at the neutral point on each plain perpendicular to the L* axis there will be $[1+N_h(N_c-1)]$ points on each plane.

The total sampling points N, will be:

$$N = N_1[1 + N_h(N_c - 1)]$$

In sampling the two end planes along the L* axis which represent the white and darkest planes, sampling points will be on the curve boundary surfaces.

It is empirically determined that for using CMYKOG 6-ink hi-fi color printing $N_1=9$, $N_h=16$, and $N_c=6$ for a total of 729 sampling points were used.

Next, as illustrated at 26 in FIG. 3, the fourth color space or color space IV, is formed by interpolating errors of calibrated points to neighboring points. For each calibrated point in the color space, there are two values. One is the calibrated value, identified by $L^*_c$, $a^*_c$, and $b^*_c$. The other value is the theoretical value computed by the model, identified as $L^*_n$, $a^*_n$, and $b^*_n$. The error of the model for this point, identified $E_1$, $E_a$, $E_b$, is given by:

$$E_L = L^*_m - L^*_c$$

$$E_a = a^*_m - a^*_c$$

$$E_b = b^*_m - b^*_c$$

Figure 5:
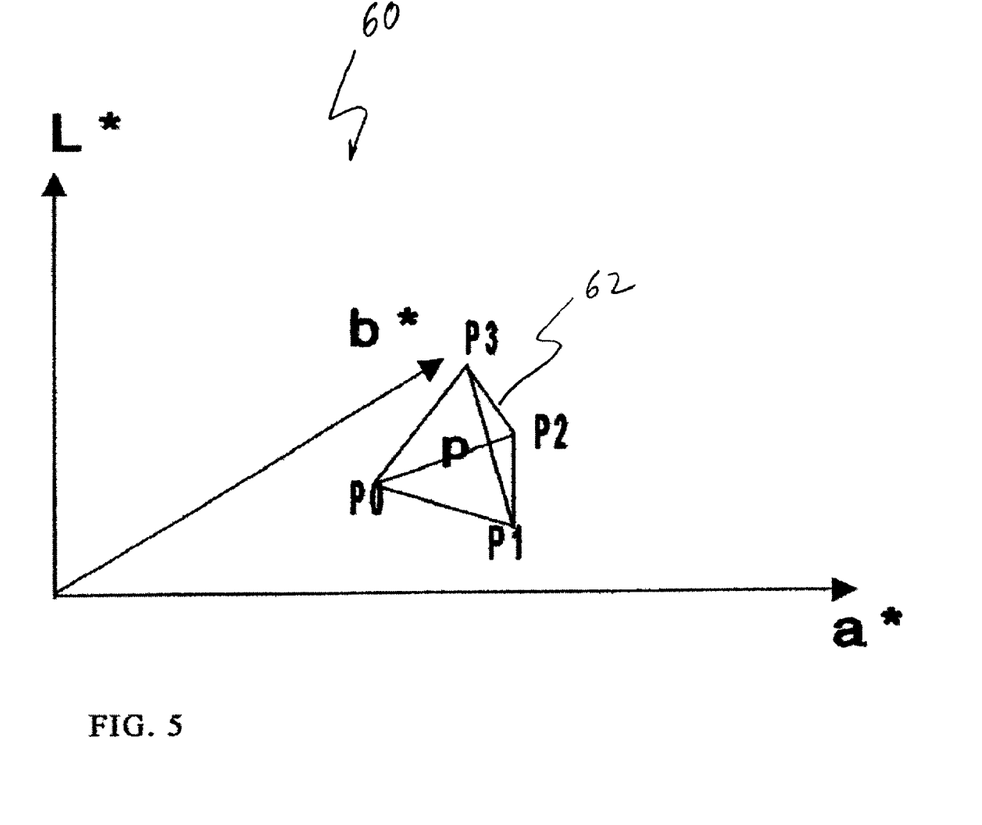
FIG. 5 is a diagrammatic view of a tetrahedron in CIELAB color space.

As is evident from the above equations, for any non-calibrated point, its corrected color value can be found if its error is known. If it is assumed that the error from the model is linearly distributed over a small area, then the use of tetrahedral linear interpolation is possible to estimate the error. The advantage of this interpolation scheme is that it does not require regular form of tetrahedran and is useful in the irregular color gamut space. In this interpolation, every four enabling calibration points $p_0$, $p_1$, $p_2$, and $p_3$(not all on the same plane), form a tetrahedron as illustrated in FIG. 5 at 62 in a color space illustrated at 60. The error, E, of any point p within the tetrahedron is computed by:

$$E = E_0 + \sum_{i=1}^{3} u_i(E_i - E_0)$$

where $u_i = V_i/V$

Where $E_0$, $E_1$, $E_2$, and $E_3$ are the known errors of the four calibrated points. V represents the volume of the tetrahedron defined by the theoretical color values of the four calibrated points in the color space. $V_i$ represents the volume of the tetrahedron defined by the theoretical color values of the four points of which the ith calibrated point is replaced by the point P. For example, $V_1$ is defined by $p_0$, $p_1$, $p_2$ and $p_3$. The computation method of the volume of the tetrahedron with known coordinates is simple and can be easily acquired by those skilled in the art. It is noted that the tetrahedron volume is all calculated with theoretical color values not the calibrated values.

After obtaining the estimated error of point P its corrected color value can be calculated and identified as $L^*_c$, $a^*_c$, $b^*_c$. The following equations are used:

$$L^*_c = L^*_m - E_L$$

$$a^*_c = a^*_m - E_a$$

$$b^*_c = b^*_m - E_b$$

This process produces the fourth color space, which is the final color space and contains calibrated and corrected color points. These color points are linked to the updated simplified colorant space, i.e. the third colorant space, including black ink. These will be used for generating the color reproduction table.

The final major step is to generate a color reproduction table, illustrated at 28 in FIG. 3. A color reproduction table of a printer is normally a 3D-to-ND lookup table where N is the number of inks. The color reproduction table accepts image data as input and outputs colorant combinations for use by the printer. Since any input can be converted to CIELAB color values, the task to generate a color reproduction table is to invert the colorant-to-color space into a color- to-colorant space relationship. That is, for a given value, find a colorant combination that can reproduce that color when it is printed on a substrate. This is accomplished by the following procedures.

First, perform a gamut mapping. Any viable gamut mapping technique could be used for hi-fi color printing. The process basically involves mapping the out-of-gamut color to the color at or closest to the nearest printer gamut surface. Next, in the fourth color space, four points are located. The four points are of a smallest tetrahedron that contains the given color point. These four tetrahedral points are either calibrated points or corrected points. A tetrahedral linear interpolation is performed to compute the colorant to values for the given color. Since the calibrated points together with the corrected points obtained by the model based interpolation have partitioned the color space into very small subregions, the error due to linear interpolation will be small. The equations involved are as follows:

$$Q = Q_0 + \sum_{i=1}^{3} w_i(Q_i - Q_0)$$

where $w_i = U_i/U$

Where $Q_0$, $Q_1$, $Q_2$, $Q_3$ are the known colorant values of the four calibrated and corrected points. U is the volume of the tetrahedron defined by the calibrated and corrected color values of the four tetrahedral points in the fourth color space. $U_i$ is the volume of the tetrahedron defined by the four points of which the ith tetrahedral point is replaced by the point to be interpolated. It should be noted that the tetrahedron volume is all calculated with the calibrated/corrected/given color values and not theoretical values.

The resulting color reproduction table is to be included in a printer driver or stored in the printer hardware, as illustrated at 30 in FIG. 3. When the printer receives image data it will translate the image data to the colorants through the color table and print the image onto the substrate.

As seen from the foregoing, the present invention provides several advantages including enhancing the ease with which a color combination can be found and the colorant space for a given color based on the one-to-one relationship between the colorant space and color space established through the printer model. Further, the actual measurements of calibration are dramatically reduced because the sampling points are determined in the color space and not the colorant space. The dimension of the colorant space increases with the number of inks used or the dimension of the color spaces independent of number of inks used. Therefore, the number of actual measurements required by the present invention are not increased exponentially with the number of inks as with previous approaches. In addition, no abrupt ink changes will occur for a smooth image because an ink amount distribution over the color space is controlled in a consistent manner when building the simplified colorant space. Finally, the present approach can be applied to any number of inks used.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for mixing inks to facilitate high fidelity color reproduction for printing, the method comprising the steps of:

computing a first color space using a forward printer model and a first colorant space, with the first color space having no black ink values from the first colorant space, thereby establishing a relationship between the first color space and the first colorant space;

computing a second colorant space using the forward printer model wherein each point in the second colorant space has one corresponding point in the first color space;

Computing a second color space using the forward printer model and CMYK ink values;

computing a third color space by comparing the second color space to the first color space to determine which color points in the first color space require black ink;

computing a third colorant space using the printer model and the third color space, wherein each point in the third colorant space has a corresponding point in the third color space;

computing a first color space by calibrating and correcting the third color space;

linking the fourth color space with the third colorant space using the forward printer model, wherein each point in the fourth color space has a corresponding point in the third color space; and forming a color reproduction table using the fourth color space and the third colorant space, for receiving a data input and providing a colorant output for use in mixing inks for high fidelity printing.

2. A method for mixing inks according to claim 1 wherein the step of computing a first color space includes using a Neugebauer printer model to calculate CIELAB color values to form the first color space, with a CIELAB color value being calculated for each colorant point in the first colorant space based on at least one predetermined measurement.

3. A method for mixing inks according to claim 2 wherein the steps of calculating CIELAB color values includes sampling each ink at seventeen substantially evenly spaced points over the range from 0–100% ink.

4. A method for mixing inks according to claim 1 wherein the step of computing a second colorant space includes the step of removing redundant colorant points including certain multiple colorant points to which a single color point corresponds, the removal step including defining a removal grade for each colorant point linked with a common color point and retaining the colorant points with the smallest removal grade for each color point in the first color space, with the second colorant space resulting from the removal of the redundant colorant points.

5. A method for mixing inks according to claim 1 wherein the step of computing a second color space includes the steps of preparing a mixed CMYK colorant space and inputting every point in the mixed CMYK colorant space into the model to compute the second color space.

6. A method for mixing inks according to claim 1 wherein the step of computing a third color space includes the steps of comparing the first color space to the second color space to determine the black ink values necessary for addition to the first color space to form the third color space.

7. A method for mixing inks according to claim 1 wherein the step of computing a third colorant space includes the step of correlating points in the third color space with points in the second colorant space using the printer model to form the third colorant space.

8. A method for mixing inks according to claim 1 wherein the step of computing a fourth color space includes the step of sampling the third color space for calibration, and comparing an actual color value from the third color space with a theoretical color value from the model.

9. A method for mixing inks according to claim 8 wherein the step of computing a fourth color space includes the step of correcting color point values found to be out of tolerance to form a fourth color space having calibrated and corrected values from the third color space.

10. A method for mixing inks according to claim 1 wherein the step of linking the fourth color space includes correlating the fourth color space point values with the third colorant space values.

11. A method for mixing inks according to claim 1 wherein the step of forming a color reproduction table includes the step of inverting the relationship between the third colorant space and the fourth color space to instill the ability to receive as input a given color value and to emit as output a corresponding colorant value.

12. A method for mixing inks according to claim 11 wherein the step of forming a color reproduction table includes the step of computing a colorant value for each color value to form the color reproduction table includes using a tetrahedral linear interpolation.

13. A printer driver computer software product embodied in a computer readable medium for controlling ink mixing to facilitate high fidelity color reproduction for printing, the software product comprising:

a color reproduction table that accepts image data as input and emits colorant combinations for use by the printer to mix inks to achieve high fidelity color printing, the color reproduction table being formed by:

computing a first color space using a forward printer model and a first colorant space, with the first color space having no black ink values from the first colorant space, thereby establishing a relationship between the first color space and the first colorant space;

computing a second colorant space using the forward printer model wherein each point in the second colorant space has one corresponding point in the first color space;

computing a second color space using the forward printer model and CMYK ink values;

computing a third color space by comparing the second color space to the first color space to determine which color points in the first color space require black ink;

computing a third colorant space using the printer model and the third color space, wherein each point in the third colorant space has a corresponding point in the third color space;

computing a fourth color space by calibrating and correcting the third color space;

linking the fourth color space with the third colorant space using the forward printer model, wherein each point in the fourth color space has a corresponding point in the third color space; and forming the color reproduction table using the fourth color space and the third colorant space, for providing a colorant output responsive to a data input for use in mixing inks for high fidelity printing.

14. A printer driver computer software product according to claim 13 wherein the step of computing a second colorant space includes the step of removing redundant colorant points including certain multiple color points to which a single point in the first color space corresponds, the removal step including defining a removal grade for each colorant point linked with the same color point and retaining the colorant points with the smallest removal grade for each color point in the first color space, with the second colorant space resulting from the removal of the redundant colorant points.

15. A printer driver computer software product according to claim 13 wherein the step of computing a second color space includes the steps of preparing a mixed CMYK colorant space and inputting every point in the mixed CMYK colorant space into the model to compute the second color space.

16. A printer driver computer software product according to claim 13 wherein the step of computing a third color space includes the steps of comparing the first color space to the second color space to determine the black ink values necessary for addition to the first color space to form the third color space.

17. A printer driver computer software product according to claim 13 wherein the step of computing a third colorant space includes using the printer model to correlate points in the third color space with points in the second colorant space to form the third colorant space.

18. A printer driver computer software product according to claim 13 wherein the step of linking the fourth color space includes correlating the fourth color space point values with the third colorant space values.

19. A printer driver computer software product according to claim 13 wherein the step of computing a fourth color space includes the step of sampling the third color space for calibration, and comparing an actual color value from the third color space with a theoretical color value from the model.

20. A printer driver computer software product according to claim 19 wherein the step of computing a fourth color space includes the step of correcting color point values found to be out of tolerance to form a fourth color space having calibrated and corrected values from the third color space.

21. A printer driver computer software product according to claim 13 wherein the step of forming a color reproduction table includes the step of inverting the relationship between the third colorant space and the fourth color space to instill the ability to receive as input a given color value and to emit as output a corresponding colorant value.

22. A printer driver computer software product according to claim 21 wherein the step of forming a color reproduction table includes the step of computing a colorant value for each color value to form the color reproduction table includes using a tetrahedral linear interpolation.

23. A printer driver computer software product according to claim 13 wherein the step of computing a first color space includes using a Neugebauer printer model to calculate CIELAB color values to form the first color space, with a CIELAB color value being calculated for each colorant point in the first colorant space based on at least one predetermined measurement.

24. A printer driver computer software product according to claim 23 wherein the steps of calculating CIELAB color values includes sampling each ink at seventeen evenly spaced points over the range from 0–100% ink.

25. In an apparatus for printing on a print medium, the improvement comprising:
   means for controlling the ink mixing to facilitate high fidelity color reproduction for printing, the control arrangement including;
   means for computing a first color space using a forward printer model and a first colorant space, with the first color space having no black ink values from the first colorant space, thereby establishing a relationship between the first color space and the first colorant space;
   means for computing a second colorant space using the forward printer model wherein each point in the second colorant space has one corresponding point in the first color space;
   means for computing a second color space using the forward printer model and CMYK ink values;
   means for computing a third color space by comparing the second color space to the first color space to determine which color points in the first color space require black ink;
   means for computing a third colorant space using the printer model and the third color space, wherein each point in the third colorant space has a corresponding point in the third color space;
   means for computing a fourth color space by calibrating and correcting the third color space;
   means for linking the fourth color space with the third colorant space using the forward printer model, wherein each point in the fourth color space has a corresponding point in the third color space; and
   means for forming a color reproduction table using the fourth color space and the third colorant space, for providing a colorant output responsive to a data input for use in mixing inks for high fidelity printing.

26. An improved printing apparatus according to claim 25 wherein the step of computing a second colorant space includes the step of removing redundant colorant points including certain multiple colorant points to which a single color point corresponds, the removal step including defining a removal grade for each colorant point linked with a common color point and retaining the colorant points with the smallest removal grade for each color point in the first color space, with the second colorant space resulting from the removal of the redundant colorant points.

27. An improved printing apparatus according to claim 25 wherein the step of computing a second color space includes the steps of preparing a mixed CMYK colorant space and inputting every point in the mixed CMYK colorant space into the model to compute the second color space.

28. An improved printing apparatus according to claim 25 wherein the step of computing a third color space includes the steps of comparing the first color space to the second color space to determine the black ink values necessary for addition to the first color space to form the third color space.

29. An improved printing apparatus according to claim 25 wherein the step of computing a third colorant space includes the step of correlating points in the third color space with points in the second colorant space using the printer model to form the third colorant space.

30. An improved printing apparatus according to claim 25 wherein the step of linking the fourth color space includes correlating the fourth color space point values with the third colorant space values.

31. An improved printing apparatus according to claim 25 wherein the step of computing a fourth color space includes the step of sampling the third color space for calibration, and comparing an actual color value from the third color space with a theoretical color value from the model.

32. An improved printing apparatus according to claim 31 wherein the step of computing a fourth color space includes the step of correcting color point values found to be out of tolerance to form a fourth color space having calibrated and corrected values form the third color space.

33. An improved printing apparatus according to claim 25 wherein the means for computing a first color space includes using a Neugebauer printer model to calculate CIELAB color values to form the first color space, with a CIELAB color value being calculated for each colorant point in the first colorant space based on at least one predetermined measurement.

34. An improved printing apparatus according to claim 33 wherein the means for calculating CIELAB color values includes sampling each ink at seventeen substantially evenly spaced points over the range from 0–100% ink.

35. An improved printing apparatus according to claim 25 wherein the step of forming a color reproduction table includes the step of inverting the relationship between the third colorant space and the fourth color space to instill the ability to receive as input a given color value and to emit as output a corresponding colorant value.

36. An improved printing apparatus according to claim 35 wherein the step of forming a color reproduction table includes the step of computing a colorant value for each color.

* * * * *